United States Patent [19]
DeCoff, Sr.

[11] Patent Number: 5,845,411
[45] Date of Patent: Dec. 8, 1998

[54] CENTERING OF OBJECTS

[76] Inventor: Dennis E. DeCoff, Sr., 10 Elmwood Ct., Hartford, Vt. 05047-0234

[21] Appl. No.: 627,085

[22] Filed: Apr. 3, 1996

[51] Int. Cl.[6] .................................................. G01D 21/00
[52] U.S. Cl. .................. 33/644; 33/712; 33/520
[58] Field of Search .............. 33/419, 425, 427, 33/448, 428, 644, 452, 464, 712, 520

[56] References Cited

U.S. PATENT DOCUMENTS

| | | | |
|---|---|---|---|
| 456,105 | 7/1891 | Adams | 33/428 |
| 1,516,420 | 11/1924 | Comeau | 33/520 |
| 2,118,747 | 5/1938 | Vest | 33/428 |
| 2,677,893 | 5/1954 | Wahl | 33/520 |
| 2,872,738 | 2/1959 | Rogers | 33/427 |
| 3,316,645 | 5/1967 | Fink | 33/464 |
| 5,437,105 | 8/1995 | Work | 33/644 |

*Primary Examiner*—Diego F. F. Gutierrez
*Assistant Examiner*—Andrew Hirshfeld
*Attorney, Agent, or Firm*—George E. Kersey, Esq.

[57] ABSTRACT

Method and apparatus for the centering of objects by positioning a slider that is not only movable within a base but also moveable therebeyond in opposite directions in relation to stop members for holding an object at a centering position where a projection extending from the slider is used to mark the center with reference to markings along the base at the slider and on the stop members.

18 Claims, 4 Drawing Sheets

CENTERING OF OBJECTS

This invention relates to the centering of objects and more particularly to the centering of stock that is to be turned by a lathe.

In the turning of objects such as "stock" by a lathe, which is a machine for the shaping of an article by holding it and turning it rapidly against the edge of a cutting or abrading tool, the stock can take the form of a support or main part as the handle of an implement to which working parts are attached or the leg of a table. In order for the turned object to have proper symmetry, it is important for it to be properly supported on the holders by which it is positioned in the lathe. If the holders are off-center relative to the object being turned, the cutting tool will gouge more deeply on one side than another and produce an undesirable asymmetry in the object being produced.

In conventional lathe practice, the centering of the stock requires careful measurement and marking in an attempt to locate the center position as precisely as possible. Any error in measurement or any slippage of the marker can produce a disaster that leads to the discard of unsuitable work product.

Accordingly, it is an objective of the invention to facilitate the centering of objects. A related objective is to facilitate the centering of stock that is to be turned by a lathe.

Another objective of the invention is to expedite the centering of objects. A related objective is to expedite the centering of stock.

SUMMARY OF THE INVENTION

In accomplishing the foregoing and related objectives the invention provides for the centering of objects using a slider positioned within a base and moveable therein. A projection extends from the slider above the base, and objects are retained on the base in relation to the projection on the slider.

In accordance with one aspect of the invention, the base is quadrilateral and the slider is extendable diagonally within the base. The base desirably contains a dovetail channel for the movement of the slider, and the path of diagonal extension is marked to indicate prescribed centering positions.

In accordance with another aspect of the invention, the object being centered is retained by a stop member extending above the base, and the stop member has an end overlying the path of the slider. The slider can include a member attached thereto for facilitating slidable movement. The projection desirably is a peg having a pointed end and a base affixed to the slider, which can be polygonal in cross-section and adapted for movement within a dovetail channel.

In a method of centering of objects in accordance with the invention, the steps include (a) positioning a slider within a base to be moveable therein; (b) providing a projection extending from the slider above the base; and (c) retaining an object on the base in relation to the projection on the slider.

The method can further include the step of extending the slider diagonally within the base, and the step of marking the path of the diagonal extension to indicate prescribed centering positions.

The method also can include the step of providing a stop member extending above the base, and the step of overlying the path of the slider by an end of the stop member.

In accordance with a further aspect of the method an attachment can be made to the slider for facilitating the slidable movement thereof, and further including the step of pointing the end of the projection to mark a desired center.

Other steps of the method include positioning the end of stock on the base symmetrically overlying the channel; determining the midpoint of the extent of the stock overlying the channel; moving the projection to the midpoint; and indicating the position of the midpoint on the stock. Another step is to terminate the projection in a point and force the stock against the point to indicate the desired center.

In a method of manufacturing apparatus for the centering of objects by the invention, the steps include (a) providing a quadrilateral base having a diagonal channel therein; (b) affixing a pointed projection to a slider; (c) positioning the slider within the channel with the projection extending above the base; and (d) attaching a stop member to the base and having an end overlying the channel; whereby an object can be positioned against the stop member overlying the channel and the position of the projection on the slider in the channel is determined to provide desired centering of the object.

The method of manufacture further includes the step of marking the channel with indications for use in determining the position of the projection to achieve the desired centering of the object.

DESCRIPTION OF THE DRAWINGS

Other aspects of the invention will become apparent after considering several illustrative embodiments taken in conjunction with the drawings in which.

DETAILED DESCRIPTION

Figure 1:
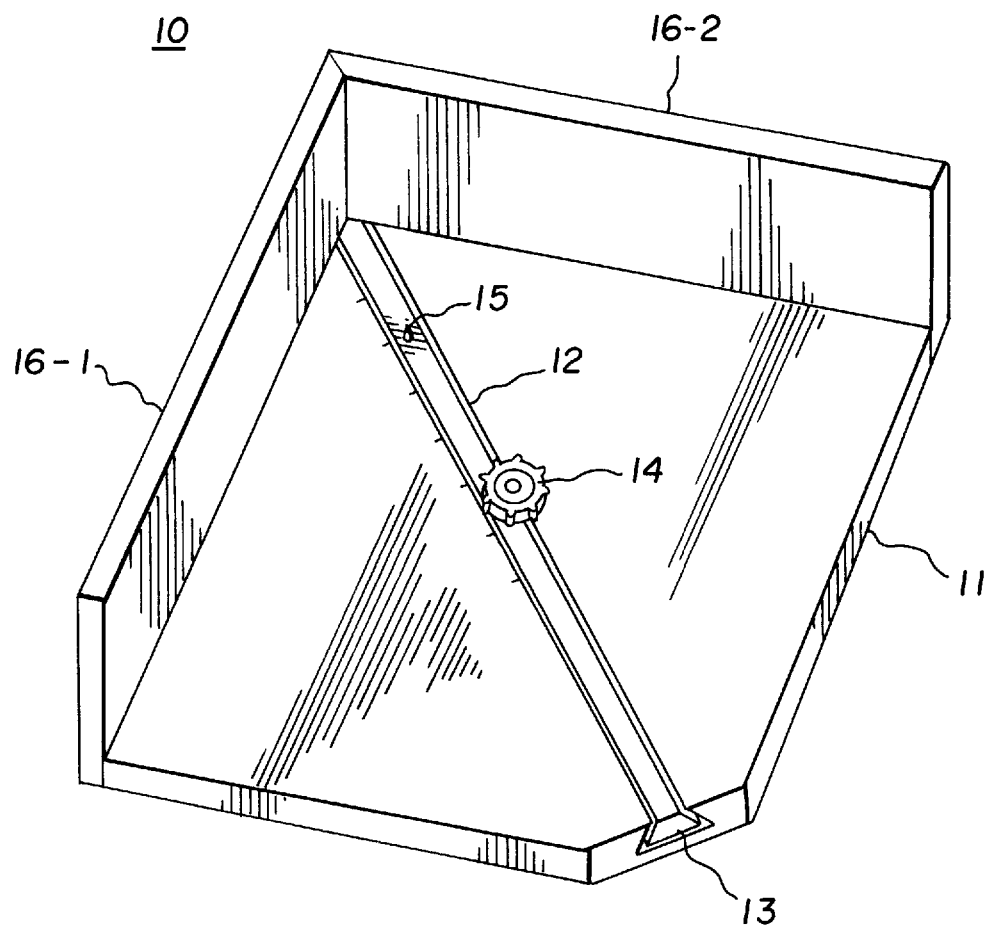
FIG. 1 is a perspective view of centering apparatus in accordance with the invention.

With reference to the drawings, FIG. 1 shows the centering apparatus 10 of the invention in perspective formed by a base 11 with a diagonal channel 12 containing a moveable slider 13. The slider is moveable in the channel 12 of the base 11 by a knob 14. In addition, the slider contains a centering member 15 and the base has stop members 16-1 and 16-2 against which the stock to be centered is positioned as described below.

Figure 2A:
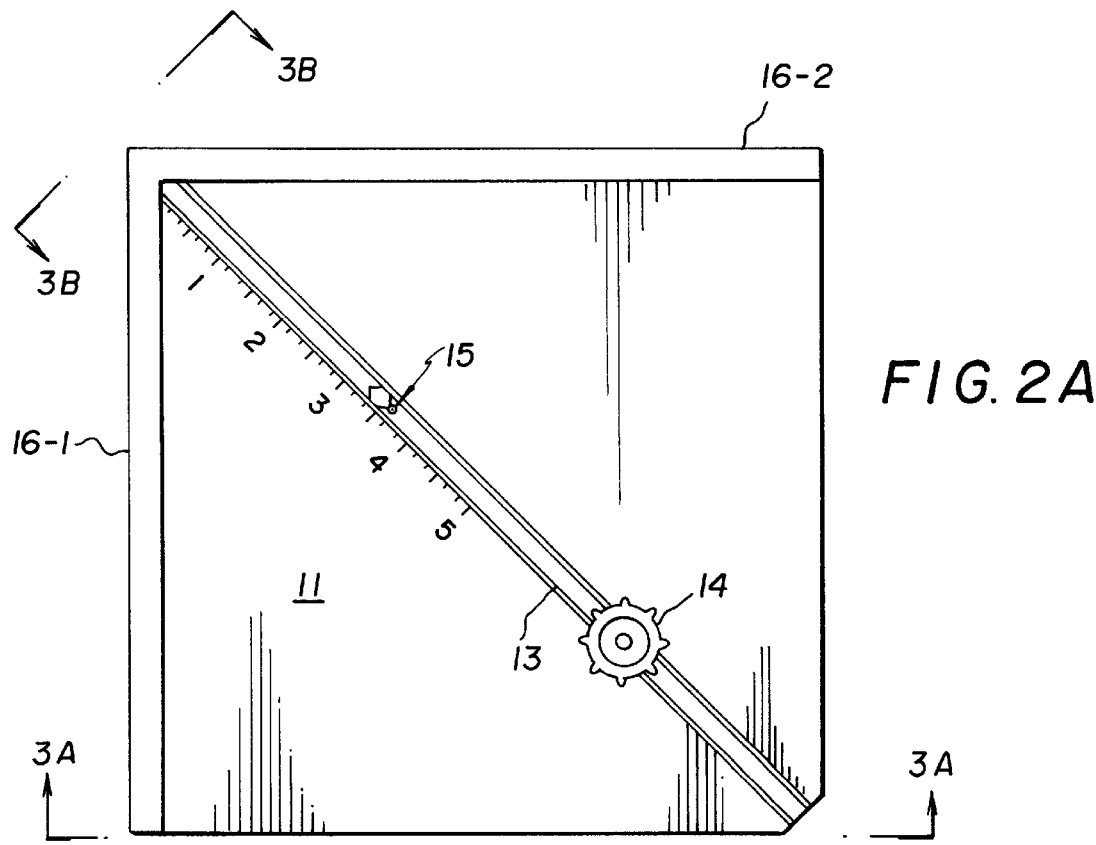
FIG. 2A is a plan view of the centering apparatus of FIG. 1.

In the plan view of FIG. 2A for the centering apparatus of FIG. 1, the base 11 is seen to be square but other quadrilateral and nonquadrilateral configurations can be employed as well. In a tested embodiment of the invention, the base 11 is a 12 inch square within the stop members 16-1 and 16-2 to accommodate up to a 10 inch workpiece.

Figure 2B:
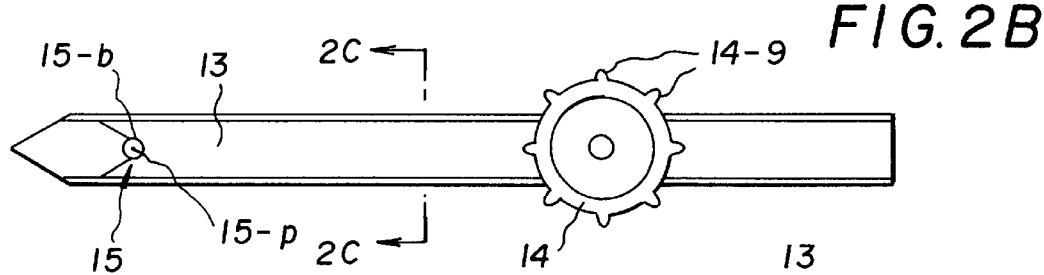
FIG. 2B is a plan view of the slider that is diagonally moveable within the centering apparatus of FIG. 2A.
Figure 2C:
FIG. 2C is a cross-section of the slider of FIG. 2B taken along the lines C—C.

The slider 13 that moves diagonally within the base 11 is shown in FIG. 2B with the centering member 15 taking the form of a projection with a base 15-*b* extending above the slider 13 to a point 15-*p*. The knob 14 is screwed into the slider 13 and has gripping elements 14-*g*. In a tested embodiment of the invention the slider was 9 inches in length and ⅜ of an inch in height in a dovetail slot that was ¾ of an inch wide and ⅜ of an inch in depth to correspond to the height of the slider 13, which is shown is cross-section in FIG. 2C taken along the lines C—C of FIG. 2B.

Figure 3B:
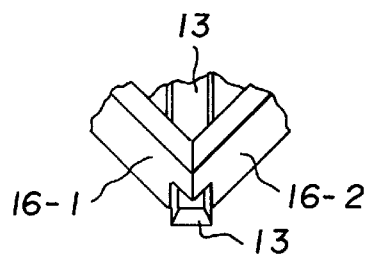
FIG. 3B is an end view of the apparatus of FIG. 2A taken in the direction of the arrows 3B—3B.
Figure 3A:
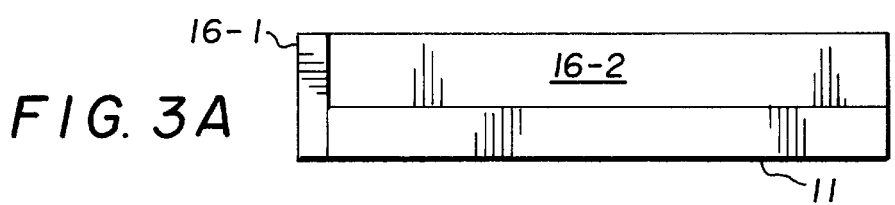
FIG. 3A is a side view of the apparatus of FIG. 2A taken in the direction of the arrows 3A—3A.

In the side view of FIG. 3A for the apparatus of FIG. 2A, taken in the direction of the arrows 3A—3A, the stop members 16-1 and 16-2 are shown abutting the base 11 which, in a tested embodiment of the invention, had a height of ⅜ of an inch while the stop members measured ½ inch by 2 ½ inches.

In the end view of FIG. 3B for the apparatus of FIG. 2A, taken in the direction of the arrows 3B—3B, the ends of the stop members 16-1 and 16-2 are notched to allow passage of the slider 13 when the projection 15 is positioned at or near the intersection of the stop members 16-1 and 16-2.

Figure 4A:
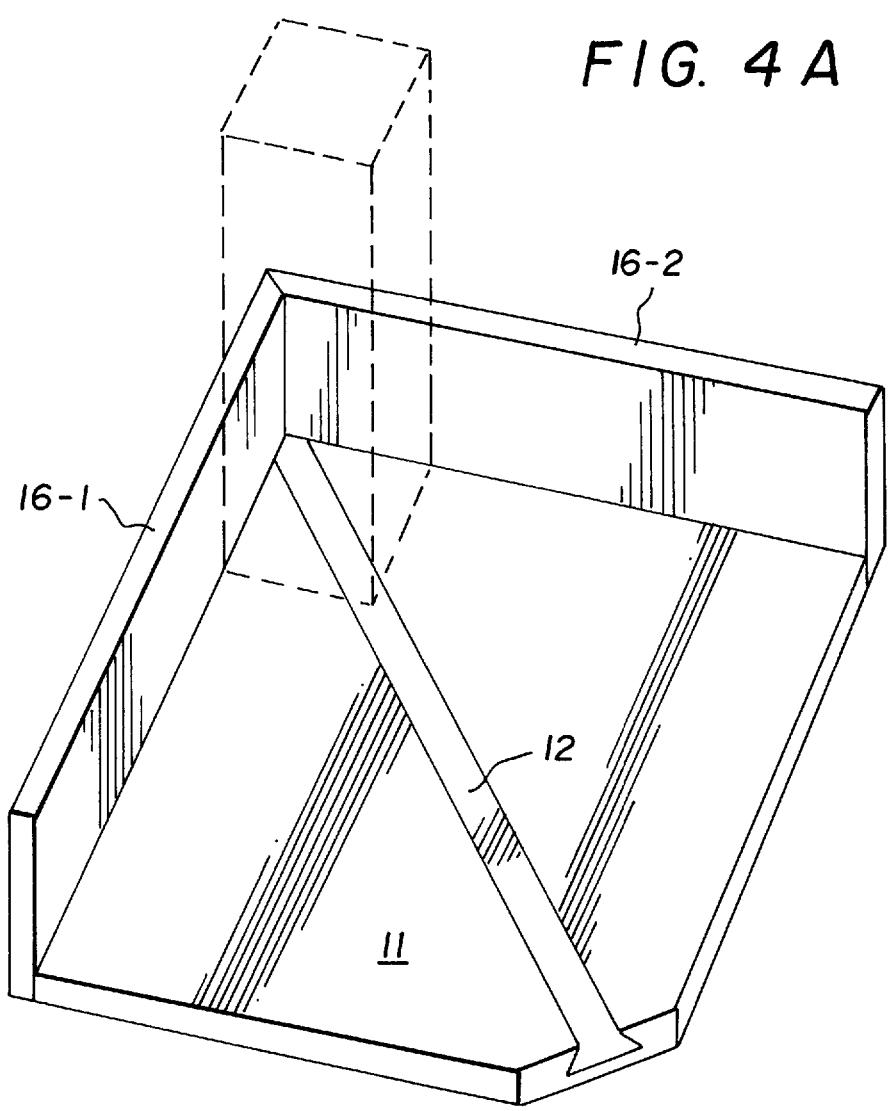
FIG. 4A is a perspective view showing the positioning of stock on the apparatus of FIG. 1 for making a determination of centering.
Figure 4B:
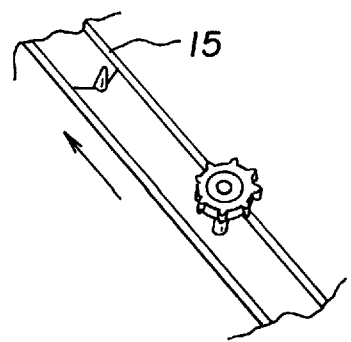
FIG. 4B is a perspective view showing the movement of the slider for marking the center of the stock in FIG. 4A.

In using the apparatus of FIG. 1, stock to be centered is positioned as shown in the perspective view of FIG. 4A with the sides of the stock abutting the stop members 16-1 and 16-2. An indication of the diagonal length of the stock is available along the diagonal within which the slider 13 is moveable. With the diagonal indication determined, the stock is temporarily removed and the slider 13 is moved to the appropriate center position for the projection 15 as shown in FIG. 4B.

Figure 4C:
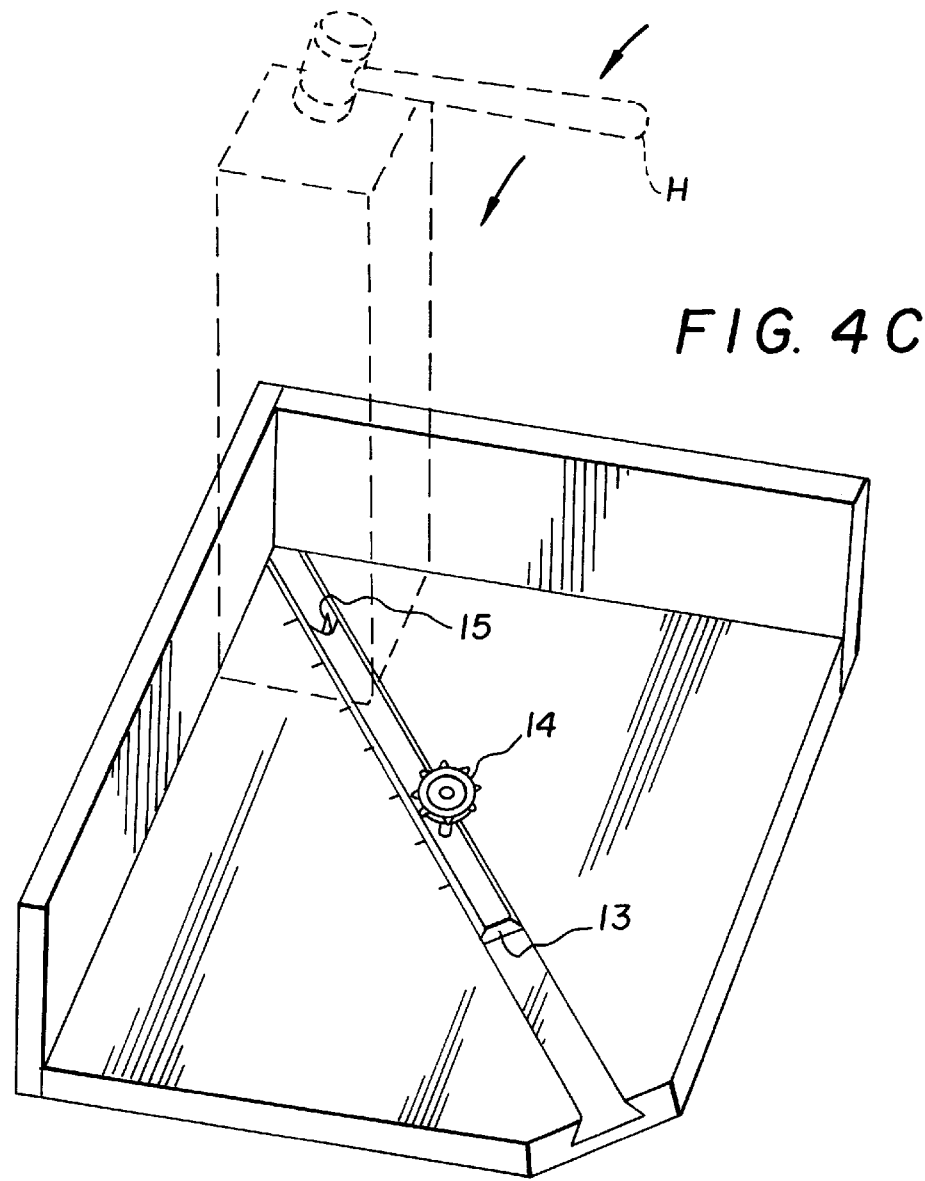
FIG. 4C is a perspective view showing the centering of the stock in FIG. 4A after movement of the slider in FIG. 4B.

Following the movement of the slider for marking the center of the stock, the stock is again positioned against the stop members and, as shown in FIG. 4C is marked appropriately, which in the case of wooden stock involves tapping with the hammer H. To mark the center of the opposite end, the stock is inverted and tapped on the opposite side.

It will be apparent that for stock that is difficult to penetrate by the projection 15, such as non-wooden stock, the projection 15 is replaced by a suitable marking instrumentality such as an ink marking source.

Figure 5:
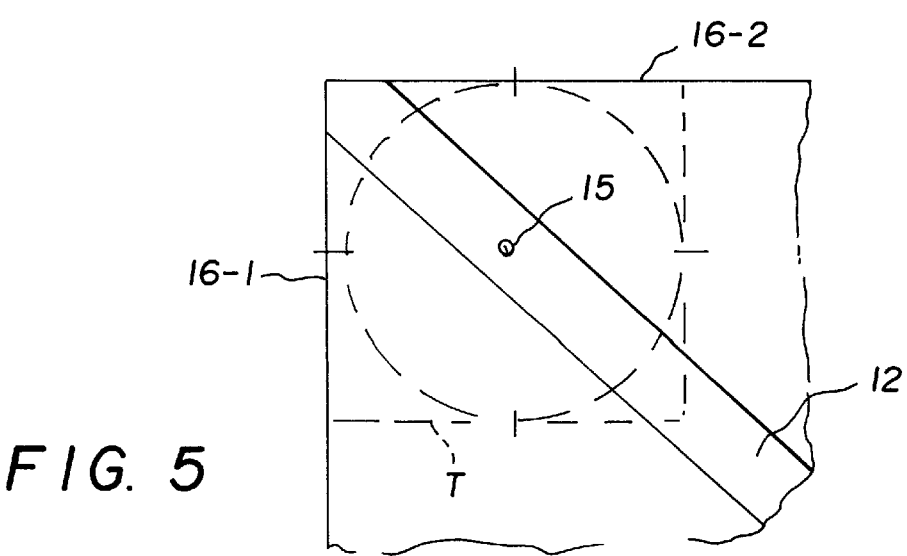
FIG. 5 is a diagram illustrating the relationship between the diagonal indications and the centering of various forms of stock in accordance with the invention.

In FIG. 5 the diagonal indications of measure can be arbitrary since the important consideration is to position the projection 15 at the center of the diagonal length. It will be appreciated that the relationship between a diagonal length and a corresponding length along either stop member 16-1 or 16-2 is the square root of 2 or 1.414 times the projected length on either of the stop members 16-1 and 16-2. In the case of circular stock the mid-position for the projection 15 is determined by ½ of the distance along the diagonal from the intersection of the tangent line T with the diagonal.

It is to be understood that the foregoing detailed description is illustrative only and that various changes in form, materials and otherwise including the substitution of equivalence can be made with departing from the spirit and scope if the invention as set forth in the appended claims.

What is claimed is:

1. Apparatus for the centering of objects comprising
   a base;
   a slider positioned within said base and moveable therein and therebeyond in opposite directions;
   projection means extending from said slider above said base; and
   walls extending upwardly from said base and overlying the path of said slider, with said walls having ends notched to allow passage of said slider when said projection means is positioned at or near said walls.

2. Apparatus as defined in claim 1 wherein said base is quadrilateral and said slider is extendable diagonally within said base and beyond opposed boundaries.

3. Apparatus as defined in claim 2 wherein said base has opposite edges and contains a dovetail channel for the movement of said slider beyond each of said opposite edges.

4. Apparatus as defined in claim 3 wherein said slider is polygonal in cross-section and adapted for movement within said dovetail channel and said stop member is marked with a linear scale.

5. Apparatus as defined in claim 2 wherein the path of diagonal extension is linearly marked next to said path to indicate prescribed centering positions.

6. Apparatus as defined in claim 1 wherein said walls are each marked to indicate prescribed centering positions.

7. Apparatus as defined in claim 1 wherein said slider includes means attached thereto for facilitating the slidable movement thereof comprising a knob with gripping elements.

8. Apparatus as defined in claim 1 wherein said projection means comprises an ink marking source having a pointed end and a base affixed to said slider.

9. The method of centering of objects comprising the steps of:
   (a) positioning a slider within a base having a channel forming a path for the slider, said slider being moveable in the base and beyond the base in opposite directions;
   (b) providing a projection extending from said slider above said base; and
   (c) retaining one of said objects on said base with respect to walls extending upwardly above said base and overlying the path of said slider, and notching ends of said walls to allow passage therethrough of said slider when said projection is positioned at or near said walls.

10. The method of claim 9 further including the step of producing the channel diagonally in the base and determining the intersection of said channel with a tangent from said one of said objects.

11. The method of claim 10 further including the step of marking the path to indicate prescribed linear centering positions and moving said projection to a position that is one half of the reading at said intersection.

12. The method of claim 10 wherein said one of said objects comprises stock having an end, including the steps of positioning the end of said stock on said base symmetrically overlying said channel; determining the midpoint of the extent of said stock overlying said channel; moving said projection to said midpoint; and indicating the position of said midpoint on said stock.

13. The method of claim 12 further including the step of terminating said projection in a point, placing the point at one-half of the distance of said intersection, and forcing said stock against said point to indicate the desired center.

14. The method of claim 9 further including the step of providing a scale on each of the walls.

15. The method of claim 9 further including the step of attaching circular means to and above said slider for facilitating the slidable movement thereof.

16. The method of claim 9 further including the step of pointing the end of said projection to mark the desired center indicated by the use of said method.

17. The method of manufacturing an apparatus for the centering of objects, comprising the steps of:
   (a) providing a quadrilateral base having a diagonal channel therein;

(b) affixing a pointed projection to a slider;

(c) positioning said slider so that said slider is moveable therein and therebeyond in opposite directions, said projection extending above said base;

(d) providing walls extending upwardly from said base and overlying the path of said slider, and notching ends of said walls to allow passage therethrough of said slider when said projection is positioned at or near said walls;

whereby one of said objects can be positioned against said walls overlying said channel and the position of said projection on said slider in said channel determined to provide desired centering of said one object.

18. The method of claim 17 further including the step of marking said channel and each of said walls with indications for use in determining the position of said projection to achieve the desired centering of said object;

whereby wherein said object has a circular cross section, said object can have its center determined by positioning said projection at the half distance of said object along said stop member.

* * * * *